(12) United States Patent
Jansson et al.

(10) Patent No.: US 10,313,276 B2
(45) Date of Patent: Jun. 4, 2019

(54) MANAGING A JITTER BUFFER SIZE

(71) Applicant: Telefonaktiebolaget LM Ericsson (publ), Stockholm (SE)

(72) Inventors: Fredrik Jansson, Sundbyberg (SE); Erlendur Karlsson, Uppsala (SE); Jonas Lundberg, Luleå (SE); Yang Zuo, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 34 days.

(21) Appl. No.: 15/514,068

(22) PCT Filed: Nov. 4, 2014

(86) PCT No.: PCT/EP2014/073679
§ 371 (c)(1),
(2) Date: Mar. 24, 2017

(87) PCT Pub. No.: WO2016/050328
PCT Pub. Date: Apr. 7, 2016

(65) Prior Publication Data
US 2017/0302598 A1     Oct. 19, 2017

(30) Foreign Application Priority Data

Sep. 30, 2014   (EP) ..................................... 14187210

(51) Int. Cl.
*H04L 12/40*     (2006.01)
*H04L 12/861*    (2013.01)
(Continued)

(52) U.S. Cl.
CPC ........ *H04L 49/9005* (2013.01); *H04J 3/0632* (2013.01); *H04L 47/283* (2013.01);
(Continued)

(58) Field of Classification Search
CPC . H04L 49/9005; H04L 65/601; H04L 3/0632; H04L 47/283; H04L 65/4084; H04L 65/602; H04L 65/607; H04L 65/80
(Continued)

(56) References Cited

U.S. PATENT DOCUMENTS

| 7,110,422 B1 | 9/2006 | Choudhury et al. |
| 2008/0114606 A1* | 5/2008 | Ojala ................... G10L 19/008 704/500 |

(Continued)

FOREIGN PATENT DOCUMENTS

WO     2009070093 A1    6/2009

OTHER PUBLICATIONS

Phelan, T., et al., "Strategies for Streaming Media Applications Using TCP-Friendly Rate Control", draft-ietf-dccp-tfrc-media-02. txt, Jul. 1, 2007, vol. dccp, No. 2, Jul. 1, 2007, XP015051153, 17 pages.

(Continued)

*Primary Examiner* — Sai Ming Chan
(74) *Attorney, Agent, or Firm* — Rothwell, Figg, Ernst & Manbeck, p.c.

(57) ABSTRACT

It is presented a method for managing a jitter buffer depth for receiving real-time communication. The method is performed in a receiver and comprises the steps of: determining an adaptive bitrate state of the receiver when a current capacity of a communication channel for receiving the real-time communication is below a maximum bitrate for receiving the real-time communication; and increasing a depth of a jitter buffer for receiving the real-time communication when the adaptive bitrate state is determined.

14 Claims, 7 Drawing Sheets

(51) Int. Cl.
  *H04J 3/06* (2006.01)
  *H04L 29/06* (2006.01)
  *H04L 12/841* (2013.01)
  *H04L 12/853* (2013.01)

(52) U.S. Cl.
  CPC ........ *H04L 65/4084* (2013.01); *H04L 65/601* (2013.01); *H04L 65/602* (2013.01); *H04L 65/607* (2013.01); *H04L 65/80* (2013.01); *H04L 47/2416* (2013.01)

(58) Field of Classification Search
  USPC .......................................................... 370/412
  See application file for complete search history.

(56) References Cited

U.S. PATENT DOCUMENTS

2010/0121974 A1* 5/2010 Einarsson ............... H04L 47/10
              709/231
2015/0110134 A1* 4/2015 Kozica ............. H04N 21/44004
              370/516

OTHER PUBLICATIONS

Schulzrinne, H., et al., "RTP: A Transport Protocol for Real-Time Applications", Network Working Group RFC Jul. 2003, 89 pages.
International Search Report and Written Opinion dated May 28, 2015 in International Application No. PCT/EP2014/073679, 8 pages.

* cited by examiner

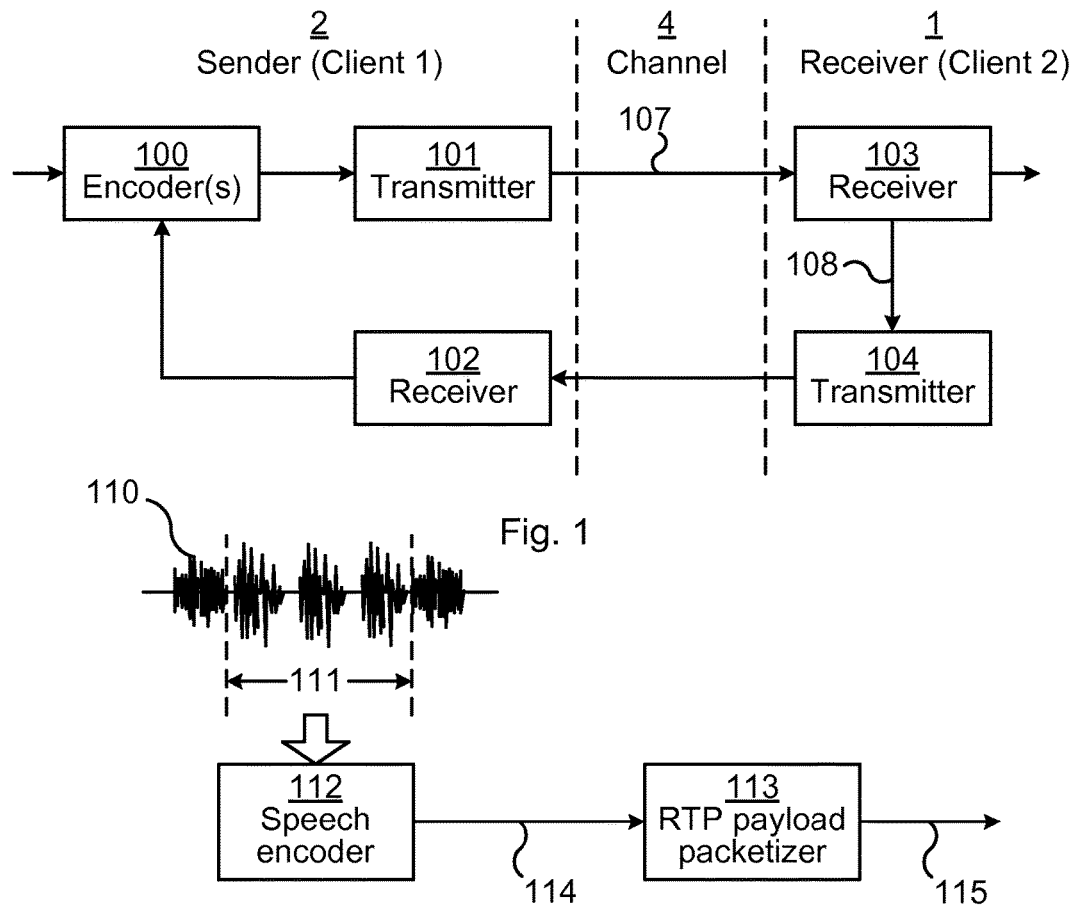
Fig. 1
Fig. 2
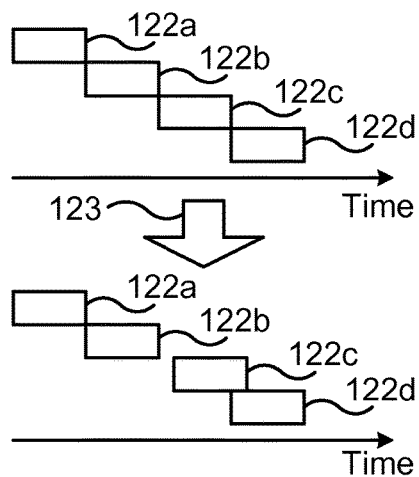
Fig. 3

MANAGING A JITTER BUFFER SIZE

CROSS-REFERENCE TO RELATED APPLICATION(S)

This application is a 35 U.S.C. § 371 National Phase Entry of International Application No. PCT/EP2014/073679, filed Nov. 4, 2014, and designating the United States, which claims priority to European Application No. 14187210.1, filed Sep. 30, 2014. The contents of both applications are incorporated by reference.

TECHNICAL FIELD

The invention relates to a method, receiver, computer program and computer program product for managing a jitter buffer depth.

BACKGROUND

The area of communication has evolved rapidly over the last years, going from traditional person-to-person phone calls to more advanced services, such as multiparty video conferencing. These services put extensive requirements on the transport network and when media like audio and video are sent over those networks, it is not uncommon that the capacity is lower than what is required to give the end user an ultimate user experience, such as for video telephony over a 3G (third generation) network. Here high definition video of several Mbps (Megabit per second) could be needed to deliver a real high quality experience, while on the other hand, such a high bitrate could only be supported under benign conditions.

Moreover, to compensate for variations in time between received packets, a jitter buffer is used in the receiver. There is a balance in the size of the jitter buffer, which is called the depth of the jitter buffer. The jitter buffer should be deep enough to allow most or all packets to arrive prior to presentation, but if it is too deep, the delay introduced by the jitter buffer reduces the quality of how the real-time communication is perceived.

Also, as a result of the varying network conditions, a video telephony service with a high fixed bitrate over mobile accesses will likely lead to quality problems and unsatisfied users. To mitigate this some services (like Skype and Apple Facetime) have implemented mechanisms to cope with temporarily congested networks, thus providing bitrate adaptation. Through various techniques they try to adapt the media stream bitrate to suit the transport channel.

However, when the bitrate adaptation increases a bitrate, this may cause increased jitter, which may result in the jitter buffer operation being insufficient.

SUMMARY

It is an object to provide a way in which adaptive bitrate is used with reduced negative impact on a jitter buffer in a receiver.

According to a first aspect, it is presented a method for managing a jitter buffer depth for receiving real-time communication. The method is performed in a receiver and comprises the steps of: determining an adaptive bitrate state of the receiver when a current capacity of a communication channel for receiving the real-time communication is below a maximum bitrate for receiving the real-time communication; and increasing a depth of a jitter buffer for receiving the real-time communication when the adaptive bitrate state is determined. By increasing the depth of the jitter buffer when the adaptive bitrate state is active, the receiver is more capable of handing potentially increased delay when adaptive bitrate is active. This reduces a risk of losing packet due to late arrival, so called late loss, during adaptive bitrate which thus significantly improves the user experience.

The step of increasing the depth of the jitter buffer may comprise limiting the rate of increase of the jitter buffer depth to a limiting increase rate.

The step of increasing the depth of the jitter buffer may be started at a time to allow the jitter buffer depth to reach a sufficient level to handle attempts of increased bitrate over the communication channel during a probing period, without exceeding the limiting increase rate.

The step of increasing a depth may comprise increasing the depth in conjunction when a probing period is about to start. In such a case, the method further comprises the steps of: requesting an increased transmission bitrate from the transmitter during the probing period; and decreasing the depth of the jitter buffer in conjunction when the probing period ends.

The step of decreasing the depth of the jitter buffer may comprise limiting the rate of decrease of the jitter buffer.

The method may further comprise the steps of: increasing an adaptation speed of the jitter buffer based on loss, in conjunction when a probing period is about to start, and decreasing the adaptation speed of the jitter buffer based on loss in conjunction when the probing period ends.

The method may further comprise the steps of: determining a maximum bitrate state by determining that a current capacity of the communication channel for receiving the real-time communication is at least the maximum bitrate for receiving the real-time communication; and decreasing the depth of the jitter buffer when the maximum bitrate state is determined.

The step of increasing the depth of a jitter buffer may comprise increasing the depth of the jitter buffer with a predetermined fixed amount for the duration of the adaptive bitrate state.

The real-time communication may comprise video data.

The real-time communication may comprise audio data.

According to a second aspect, it is presented a receiver arranged to manage a jitter buffer depth for receiving real-time communication. The receiver comprises: a processor; and a memory storing instructions that, when executed by the processor, causes the receiver to: determine an adaptive bitrate state of the receiver when a current capacity of a communication channel for receiving the real-time communication is below a maximum bitrate for receiving the real-time communication; and increase a depth of a jitter buffer for receiving the real-time communication when the adaptive bitrate state is determined.

The instructions to increase the depth of the jitter buffer may comprise instructions that, when executed by the processor, causes the receiver to limit the rate of increase of the jitter buffer to a limiting increase rate.

The instructions to increase the depth of the jitter buffer may comprise instructions that, when executed by the processor, causes the receiver to start the increase at a time to allow the jitter buffer depth to reach a sufficient level to handle attempts of increased bitrate over the communication channel during a probing period, without exceeding the limiting increase rate.

The instructions to increase a depth may comprise instructions that, when executed by the processor, causes the receiver to increase the depth in conjunction when a probing period is about to start. In such a case, the instructions further comprise instructions that, when executed by the processor, causes the receiver to: request an increased transmission bitrate from the transmitter during the probing period; and decrease the depth of the jitter buffer in conjunction when the probing period ends.

The instructions to decrease the depth of the jitter buffer may comprise instructions that, when executed by the processor, causes the receiver to limit the rate of decrease of the jitter buffer.

The instructions may further comprise instructions that, when executed by the processor, causes the receiver to: increase an adaptation speed of the jitter buffer based on loss, in conjunction when a probing period is about to start; and decrease the adaptation speed of the jitter buffer based on loss in conjunction when the probing period ends.

The instructions may further comprise instructions that, when executed by the processor, causes the receiver to: determine a maximum bitrate state when a current capacity of the communication channel for receiving the real-time communication is at least the maximum bitrate for receiving the real-time communication; and decrease the depth of the jitter buffer when the maximum bitrate state is determined.

The instructions to increase the depth of a jitter buffer may comprise instructions that, when executed by the processor, causes the receiver to increase the depth of the jitter buffer with a predetermined fixed amount for the duration of the adaptive bitrate state.

The real-time communication may comprise video data.

The real-time communication may comprise audio data.

According to a third aspect, it is presented a receiver comprising: means for determining an adaptive bitrate state of the receiver when a current capacity of a communication channel for receiving the real-time communication is below a maximum bitrate for receiving the real-time communication; and means for increasing a depth of a jitter buffer for receiving the real-time communication when the adaptive bitrate state is determined.

According to a fourth aspect, it is presented a computer program for managing a jitter buffer depth for receiving real-time communication, the computer program comprising computer program code which, when run on a receiver causes the receiver to: determine an adaptive bitrate state of the receiver when a current capacity of a communication channel for receiving the real-time communication is below a maximum bitrate for receiving the real-time communication; and increase a depth of a jitter buffer for receiving the real-time communication when the adaptive bitrate state is determined.

According to a fifth aspect, it is presented a computer program product comprising a computer program according to claim 21 and a computer readable means on which the computer program is stored.

BRIEF DESCRIPTION OF THE DRAWINGS

The invention is now described, by way of example, with reference to the accompanying drawings, in which:

FIG. 1 is a schematic diagram illustrating adaptive media transmission between a transmitter and a receiver;

FIG. 2 is a schematic diagram illustrating speech encoding in the transmitter of FIG. 1;

FIG. 3 is a schematic diagram illustrating delay jitter in the system of FIG. 1 according to one embodiment;

DETAILED DESCRIPTION

Figure 4:
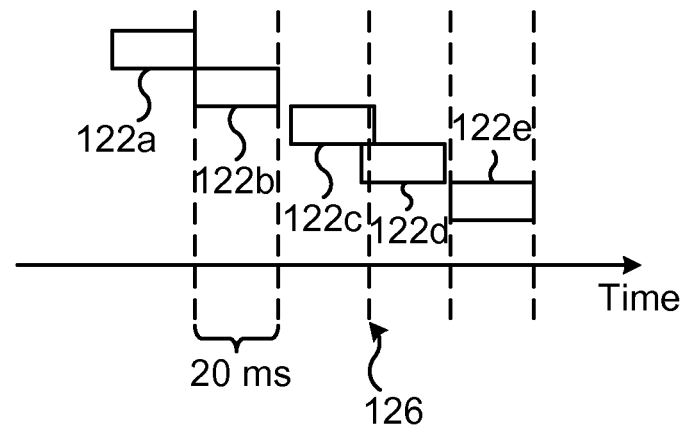
FIG. 4 is a schematic diagram illustrating speech late loss due to jitter in the system of FIG. 1 according to one embodiment.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

FIG. 1 is a schematic diagram illustrating adaptive media transmission between a transmitter (sender) 2 and a receiver 1. Both the transmitter and receiver are end points in real-time communication and are thus denoted clients. The real-time communication can e.g. be audio and/or video communication. Here, the sender 2 is denoted client 1 and the receiver 1 is denoted client 2. In FIG. 1, we focus on the upper path, where the sender 2 comprises an encoder (for video and/or audio) too and a transmitter module tot, transmitting data 107 over a channel 4 to the receiver 1. The receiver 1 comprises a receiver module 103 to receive the data for decoding and presentation. Moreover, the receiver 1 comprises a transmitter module 104 which can send data in the opposite direction over the channel 4 to the sender 2, which also comprises a receiver module 102. In this way, the receiver module 103 of the receiver 1 can send feedback data 108 via its transmitter module 104 to the receiver module 102 of the sender 2.

It is to be noted that either or both of the sender 2 and receiver 1 can form part of a gateway (e.g. between different communication protocols) or multiplexer multiplexing several communication links on a common bearer. In such a case, the clients in FIG. 1 do not need to be actual end-points in the whole communication and there can be other communication components on the other side of the transmitter and/or receiver of the link shown in FIG. 1.

In general, adaptation works such that the clients and/or network nodes measure parameters like packet loss, jitter, inter arrival delay etc. that have a correlation with the current capacity the channel 4, which can vary due to e.g. congestion, radio conditions, etc. These measurements are then used to control the media bitrate of the sending client, e.g. using the control data 108.

FIG. 1 shows an example where the transmitter 101 transmits encoded audio and/or video over a non-ideal channel 4 and the receiver 103 measures the quality of the received bit stream. This measurement is then used as feedback 108 in a feedback loop to the transmitter to thereby determine what bitrate to use for the encoding of audio and video in the sending client.

It is to be noted that in a communication service, the scheme is typically duplicated in the reverse direction. In other words, the device 2 implementing the transmitter in FIG. 1 also typically comprises the receiver 102 and the device implementing the receiver in FIG. 1 also typically comprises the transmitter 104 to be used for the real-time communication.

FIG. 2 is a schematic diagram illustrating speech encoding in the transmitter of FIG. 1. An audio and/or video encoder 112 (such as the encoder 100 of FIG. 1) encodes a time interval 111 of input data 110, a so called frame into encoded data which a packetizer (e.g. real time protocol payload packetizer) 113 redistributes into one or several data packets 115 as shown in FIG. 2. At the receiver side, the media decoder expects to receive the data corresponding to one frame in time for that frame to be rendered or otherwise presented to a user.

FIG. 3 is a schematic diagram illustrating delay jitter. In a packet switched (e.g. IP (Internet Protocol)-based) network where there is no dedicated transport channel for each session, the delay between the transmitter and the receiver will not always be fixed, i.e. the time between received packets at the receiver (inter arrival time) will not be the same as they were on the sending side. This variation in the delay is normally called "delay jitter" or just "jitter", e.g. as shown in FIG. 3.

In the upper part of FIG. 3, there are four packets 122a-d being transmitted over a channel 123 to the receiver which is illustrated in the lower part. In the receiver, the time difference between the arrival times of adjacent packets 122a-d varies in time. This variation is the delay jitter.

There are several reasons for delay jitter, if the data from several users and/or applications are time sharing a common resource (e.g. using a common Ethernet resource cable), collisions might occur. The effect is that some packets will be sent directly but others have to avoid collisions by waiting to be sent, thus being delayed. Another source of jitter is retransmissions in lower protocol layers, for example as in HSPA (High Speed Packet Access) or LTE (Long Term Evolution). There is also the possibility that individual packets traverse the network over different paths which might lead to jitter and even packet reordering, i.e. packets arriving at the receiver in a different order than in which they were sent.

FIG. 4 shows an example of jitter, corresponding to the lower part of FIG. 3. In this example, a speech coder producing 20 ms frames is used on the transmitter side. In this case the receiver has to produce a 20 ms frame of audio every 20 ms, the playout times (or presentation times) indicated by the dashed lines. If the time since receiving the previous frame exceeds 20 ms there will be an issue. This is typically treated like a packet loss and an error concealment procedure in the decoder will be triggered to produce an audio frame to "cover up" or reduce the effects of the loss, even if the packet then arrives at a later time. This situation is called late loss and leads to a degradation of the audio quality in the same way as a packet that is lost in transmission would do. Correspondingly for video, late loss leads to reduced quality in presentation. In the example shown in FIG. 4, the third packet 122c has not been received in its entirety prior to its playout time start 126, thus resulting in a late loss.

Figure 5:
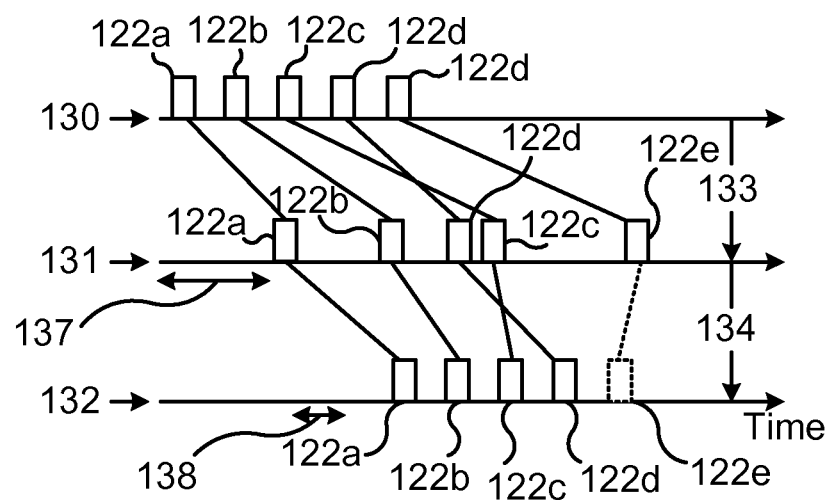
FIG. 5 is a schematic diagram illustrating a fixed jitter buffer in the system of FIG. 1 according to one embodiment.

FIG. 5 is a schematic diagram illustrating a fixed jitter buffer. A solution to the problem described above with reference to FIG. 4 is to buffer data in a jitter buffer in the receiver before rendering the media, i.e. wait to start rendering until a number of packets have been received as illustrated in FIG. 5. The jitter buffer is a very useful component in any type of packet based real time communication system.

In FIG. 5, there is a transmission timeline 130, a reception timeline 131 and a playout timeline 132. From the transmission timeline 130 to the reception timeline 131, packets are transmitted over a communication channel 133. From the reception timeline 131 to the playout timeline 132, packets pass through a jitter buffer 134.

In this example, the third packet 122c is delayed in the transmission over the communication channel 133 (e.g. due to retransmission), such that it is actually received after the fourth packet 122d. However, through the use of the jitter buffer 134, the four first packets 122a-d can all be presented in the right sequence order and equally spaced in time.

In its simplest form a jitter buffer will have a fixed depth (corresponding to a fixed delay). In this case, all packets which have experienced an additional channel delay below the jitter buffer depth will be received in time for the decoder to render the media at the correct time, as illustrated by the first four packets 122a-d on the playout timeline 132. However, if a delay is greater than the jitter buffer depth, a late loss will occur, as illustrated by the fifth packet 122e on the playout timeline 122e.

If the jitter characteristics of the transmission channel is stable and well known, the depth of a fixed jitter buffer can be selected such that there will be a predefined acceptable rate of late loss. However, in many applications the channel characteristics will not be known in which case an adaptive jitter buffer is the preferred solution.

In an adaptive jitter buffer, the jitter of the received packets is continuously measured and the depth of the jitter buffer is adjusted accordingly. In one embodiment, the adaptation of the jitter buffer is based on late loss. In practice, the depth adjustment can be a quite complex function that includes e.g. time scaling of audio where the delay is altered without needing to discard packets. In some cases this adjustment will introduce a quality degradation of the media. Any suitable adaptive jitter buffer can be employed with the embodiments presented herein.

Figure 6:
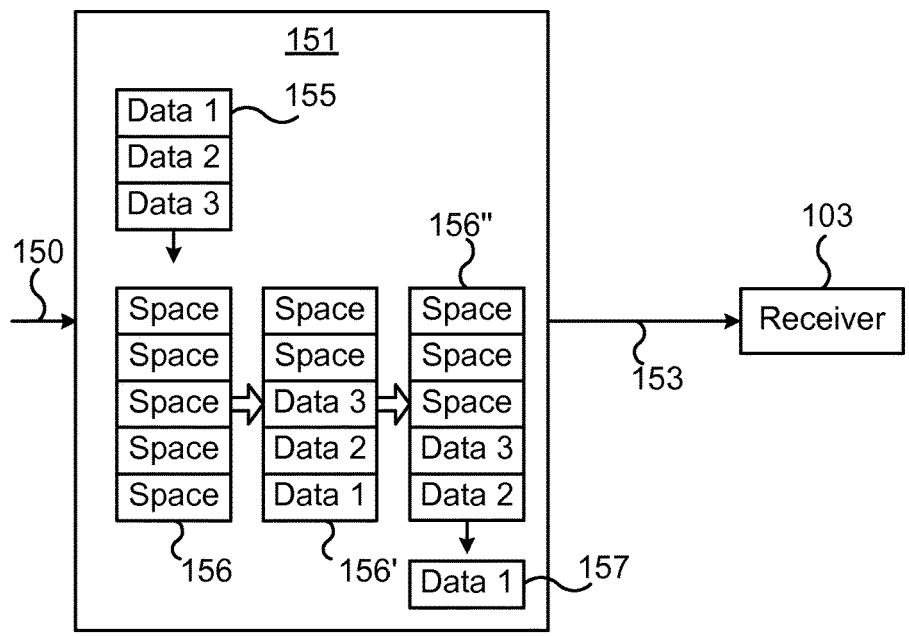
FIG. 6 is a schematic diagram illustrating a transmission buffer according to one embodiment.

FIG. 6 is a schematic diagram illustrating a transmission buffer 151. Most nodes in a network channel path incorporate a transmission buffer 151. This is normally a FIFO (First In First Out) buffer where incoming data 150 in the form of packets 155 are stored before they will be transmitted on a transmission link 153 to the receiver 103 in the order they were received by the transmission buffer 151. If the bitrate of the incoming packets is lower than the capacity of the transmission link 153, the transmission buffer will just act as a momentary storage of the next packet to be sent.

As schematically shown in FIG. 6, a buffer 156 is a FIFO buffer comprising five spaces. In a first state 156 of the buffer is empty. The incoming packets 155 are received and are placed in the buffer in the order they are received, resulting in a second state 156' of the buffer. Data is then popped from the bottom, whereby a first data packet 157 is transmitted first, resulting in a third state 156" of the buffer.

In this way, temporary variations in the incoming bitrate will be smoothed by the transmission buffer, for example in the case where a video frame is split into several packets sent from the source directly after each other. In this case the storage in the transmission buffer will introduce a delay jitter, i.e. an individual change in the delay for each packet. However, as long as the incoming average bitrate is lower than the capacity of the transmission link, there will be no increase in delay introduced by the transmission buffer apart from the so called serialization delay introduced by the transmission link.

However, if the bitrate for incoming data 150 is higher than the capacity of the transmission link 153, more data will be stored into the transmission buffer 151 than what is taken out at the other end. This will lead to a build up of delay that will continue until either the buffer becomes full, at which point incoming packets will be discarded, or until the incoming bitrate is below the transmission capacity. The latter can happen either if the transmission capacity is increased, for example because a congestion situation is improved, or if there is an adaptation scheme implemented that will lower the incoming bitrate to fit the transmission capacity.

In a real world connection between two clients, there can be several transmission buffers and bottleneck parts in the path. However, for ease of understanding embodiments presented herein, this description is limited to one transmission buffer.

In most cases there is an upper limit set for the bitrate adaptation, a maximum bitrate. For example, a video conferencing service with a maximum resolution of 720 p could give very good quality at 1.5 Mbps. Going above 1.5 Mbps will give marginal or even negligible improvement for typical conferencing scenes with moderate movement in the video.

At a first glance it might not be obvious why it is good to set a maximum bitrate for this service. However, there are drawbacks in using a higher bitrate, since more capacity will be used without any increase in quality. This capacity can be used for other services in parallel or can be used by other users in the system. There might also be cost implications of using more capacity and there could be more variation in the bitrate if you try to follow the available channel capacity. Given these drawbacks and the fact that there is little quality improvement above 1.5 Mbps, setting a maximum bitrate of 1.5 Mbps would be a good design choice in this specific case. The maximum bitrate can of course vary in each situation and depends on resolution, media type (video and/or audio), content type (video conference/sport, etc.), etc.

Figure 7:
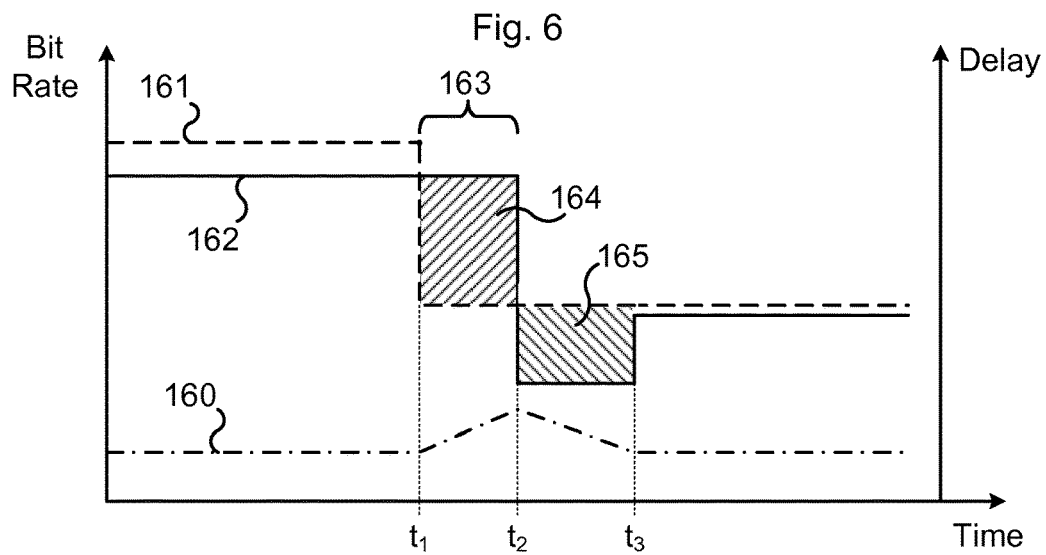
FIG. 7 is a schematic diagram illustrating channel overuse according to one embodiment.

FIG. 7 is a schematic diagram illustrating channel overuse when channel capacity decreases. The upper part relates to bitrate, measured on the left axis. The lower part relates to delay, measured on the right axis. The horizontal time axis is common to both the upper part and the lower part. A dashed line 161 represents channel throughput, i.e. the bitrate capacity of a channel. A solid line 162 represents transmission bitrate. A dash dotted line 160 represents delay.

Looking now to various states, with a maximum bitrate implemented one can divide the operation of any adaptation scheme into two states:

1. Maximum bitrate state: in this state the channel can support the maximum bitrate and the adaptation scheme is inactive. This is the case up until a first point in time t1 in FIG. 7.

2. Adaptive bitrate state: in this state the channel capacity is lower than the maximum bitrate. The means that the adaptation scheme is active with the implications described below. This is the case after the first point in time t1 in FIG. 7.

In the adaptive bitrate state, there is both down-adapting and up-adapting. In down-adapting, the channel capacity 161 changes at the first point in time t1 to be below the transmission bitrate. This results in an over-use 164 of the channel. The over-use 164 of the channel will be detected by the receiver (and/or the transmitter) and as a result the receiver will request a bitrate decrease (or the transmitter will decrease bitrate without a request from the receiver) of the encoder on the transmitter side.

The temporary over-use 164 of the channel will lead to a delay build up in the transmission buffer as seen by the increase in delay 160 between the first point in time t1 and a second point in time t2. With a proper design of the adaptation scheme, the transmitter bitrate will be lowered below the capacity of the channel to allow the excessive data in the transmission buffer to be emptied thus removing the additional delay built up during the over-use. This occurs at the second point in time t2. The time between the channel capacity reduction and the reduction transmission bitrate is called adaptation reaction time 163. A transmission bitrate 162 significantly below the channel capacity 161 in a recovery phase 165 allows a reduction of the transmission buffer between the second point in time t2 and a third point in time t3, at which point the transmission bitrate 162 is increased to be closer to the channel capacity 161. During the recovery phase 165, the delay 160 is reduced. The result will be a peak in the delay 160 as shown in the lower part of FIG. 7.

In the up-adapting case, the channel capacity can handle the bitrate produced by the transmitter but the used bitrate is below the maximum bitrate. In this situation, the adaptation scheme strives to increase the bitrate to utilize the available bitrate as much as possible to ultimately reach the maximum bitrate. In some cases, maximum bitrate may never be reached due to the limitations of the channel capacity.

Figure 8:
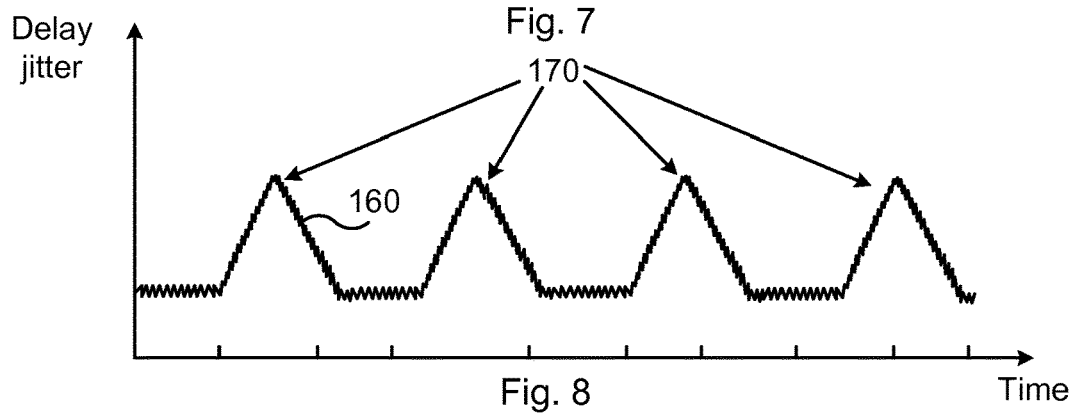
FIG. 8 is a schematic diagram illustrating delay peaks due to probing according to one embodiment.

FIG. 8 is a schematic diagram illustrating peaks in delay 160 due to probing. In most cases, it is not possible to analytically calculate the available bitrate; instead the adaptation scheme probes the channel by requesting the transmitter to increase the bitrate somewhat and then measuring the received packets to see if the new bitrate over-uses the channel.

In a case with a channel with a stable limitation below the maximum bitrate, the repeated unsuccessful bitrate probes will give a repetitive peak pattern of the delay 160 as shown in FIG. 8. If a fixed jitter buffer is used and the delay peaks are outside the depths of the jitter buffer, there will be frequent late loss and rebuffering, causing distinct quality degradation.

In an adaptive jitter buffer, there is one part that estimates the amount of delay jitter in order to adjust the depth of the buffer accordingly. As with many similar signal processing problems, there is a trade-off between speed and accuracy. There is also a trade-off in how often and fast the adaptation of the depth is allowed to be performed and the negative impact that the adaptation itself (e.g. using time scaling of audio) has on the quality.

Figure 9:
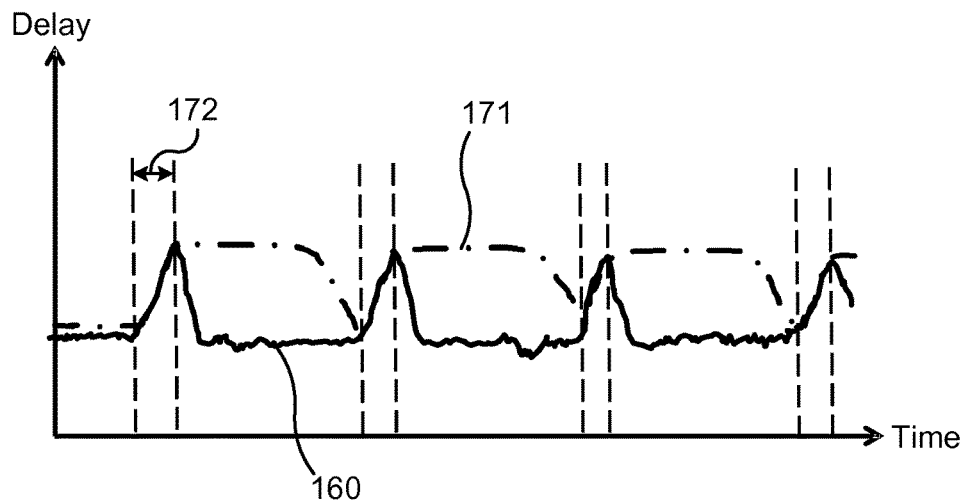
FIG. 9 is a schematic diagram illustrating effects of the probing when an adaptive jitter buffer is employed according to one embodiment.

FIG. 9 is a schematic diagram illustrating effects of the probing when an adaptive jitter buffer is employed. The dot dashed line 171 illustrates end-to-end delay with an adaptive jitter buffer. The solid line 160 illustrates delay with peaks due to probing. The short duration 172 between the dashed lines is the probing period.

In the probing period 172, the depth adaptation in the jitter buffer will try to adjust the jitter buffer depth to handle the repetitive delay pattern created by the probing as explained above. This might not be an easy task given the speed/accuracy trade-off and in worst case it might even lead to a contra productive adjustment as shown in FIG. 9. During the probing period, this solution may suffer from late losses and frequent rebuffering causing distinct quality degradation. Once the jitter buffer has increased in depth due to the probing period, there is typically a configured inertia to change of the jitter buffer, whereby the jitter buffer stays at the greater depth for awhile before the jitter buffer depth decreases. This inertia can be configurable and can vary between implementations.

In other words, a bitrate adaptation scheme will introduce a delay jitter that can have a negative impact on the performance of the jitter buffer.

Figure 10:
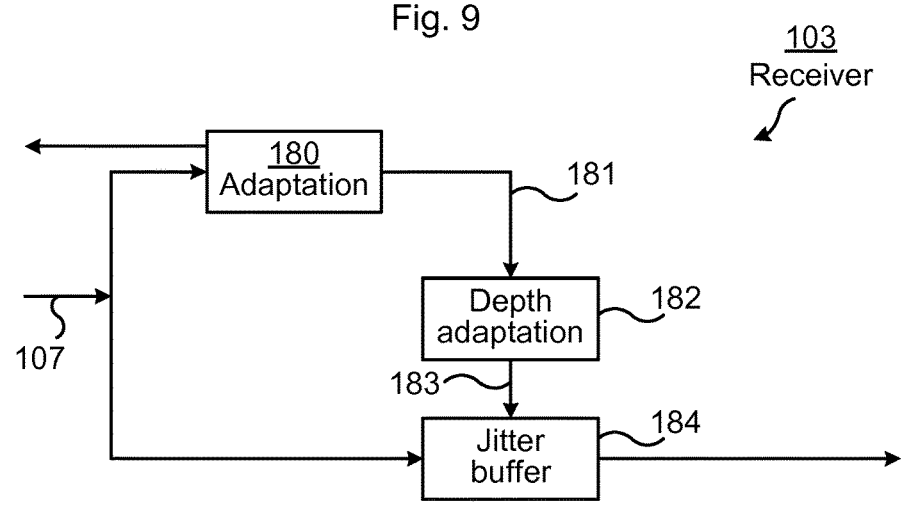
FIG. 10 is a schematic diagram illustrating an embodiment of a receiver with a jitter buffer according to one embodiment.

FIG. 10 is a schematic diagram illustrating an embodiment of a receiver 103 with a jitter buffer device 184. In embodiments presented in, the bitrate adaptation scheme 180 and the jitter buffer 184 both have parts residing in the receiver 103 of the client and can be made to communicate without the additions of any complex, standardized protocols.

In short, embodiments presented herein use information from the bitrate adaptation 180 to control the depth in a depth adaptation 182 of the jitter buffer 184, e.g. as shown in FIG. 10. This control has two modes:

1. If the network adaptation is in its maximum bitrate state, the jitter buffer depth adaptation should adapt its depth according to its own measurement of the delay jitter in the received packet stream.
2. If the network adaptation is in its adaptive bitrate state, an extra delay should be added to the jitter buffer depth. The delay can be calculated by the jitter estimation of the adaptive jitter buffer. The extra delay added should be higher than the delay peaks to avoid late loss and frequent rebuffering as an effect of the delay peaks that will occur in this state.

In this way, the behaviour shown in FIG. 9 can be avoided with a better user experience as a result.

The extra end-to-end delay added in the adaptive bitrate state will have a small negative impact on conversational quality, but that will most likely be outweighed by the positive effects of a lower late loss and less rebuffering that the added jitter buffer depth will give.

Hence, embodiments presented herein use information from the bitrate adaptation to improve the function of the jitter buffer. As explained above, one embodiment comprises adding a fixed delay depth to the jitter buffer during the periods during which the bitrate probing occurs. This solution will work with a fixed jitter buffer, i.e. a jitter buffer that does not try to adapt its buffer size to the actual jitter.

Figure 11:
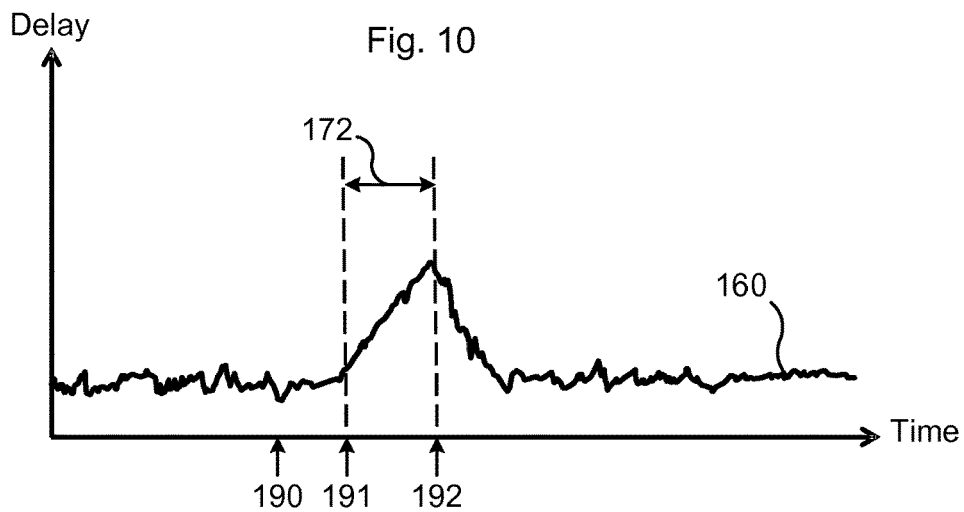
FIG. 11 is a schematic diagram illustrating a single probing period according to one embodiment.
Figure 12:
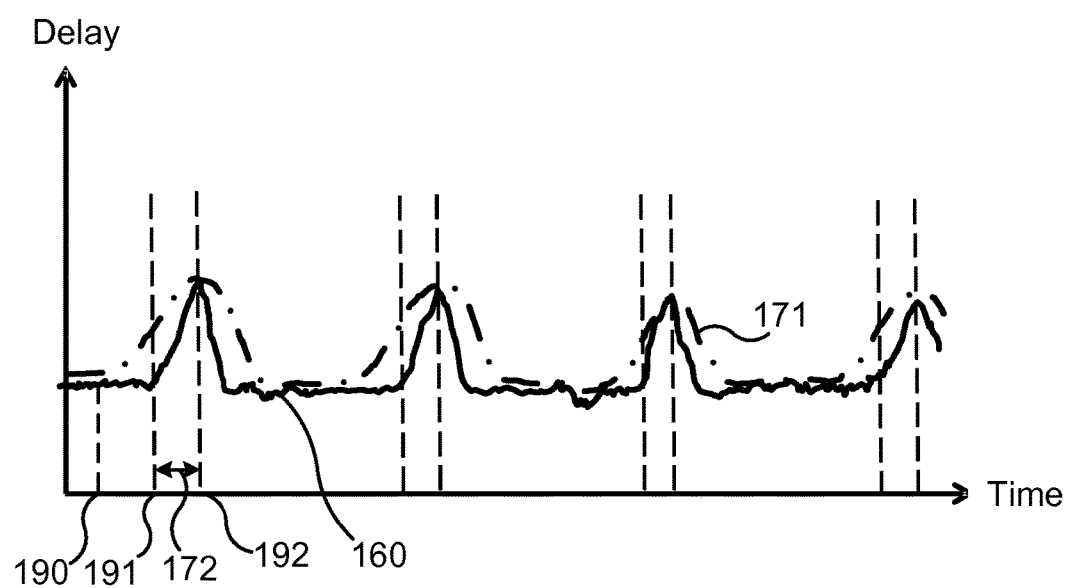
FIG. 12 is a schematic diagram illustrating delay when using an embodiment presented herein.

FIG. 11 is a schematic diagram illustrating a single probing period. FIG. 12 is a schematic diagram illustrating delay when using an embodiment presented herein. With an adaptive jitter buffer, it may be beneficial to do something more advanced than to just add a fixed delay depth.

One alternative shown in FIG. 11 and FIG. 12 is to store the state of the jitter estimation algorithm when the probing is started at a start time 191 and then, when the probing is over at a stop time 192, revert to that state. This state can e.g. comprise adaptation speed of the jitter buffer, whereby the adaptation speed can be increased during the probing period to allow faster adaptation of the jitter buffer during this period. By reverting to the initial state after the probing period, jitter caused by probing will be prevented from affecting future jitter estimates. In both cases it might also be a good idea to signal at an advance time 190 to start in advance (advance start), allowing a slower depth adjustment. The slower depth adjustment allows the jitter buffer to be increased with reduced or even negligible effect on end user experience. Similarly, the reduction of the jitter buffer after the probing can also be performed at a rate where the effects on the end user experience are small or even negligible.

In FIG. 12, the resulting end-to-end delay 171 follows the probing periods of the transmission delay 160. Also, the rate of change of the end-to-end delay 171 is limited both when increasing and decreasing the buffer depth to prevent negative artefacts, e.g. time scaling of audio.

Measurements and signal processing on the packet arrival times are often part of a bitrate adaptation scheme. As this has similarities with the measurements done in an adaptive jitter buffer there may be more synergies that can be exploited to improve performance.

Figure 13A:
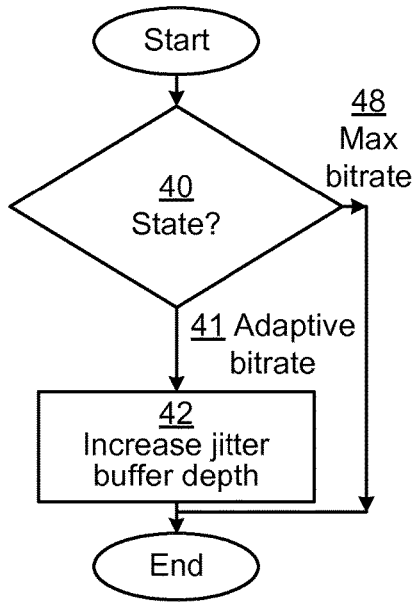
FIGS. 13A-B are flow charts illustrating embodiments of methods for managing a jitter buffer size.
Figure 13B:
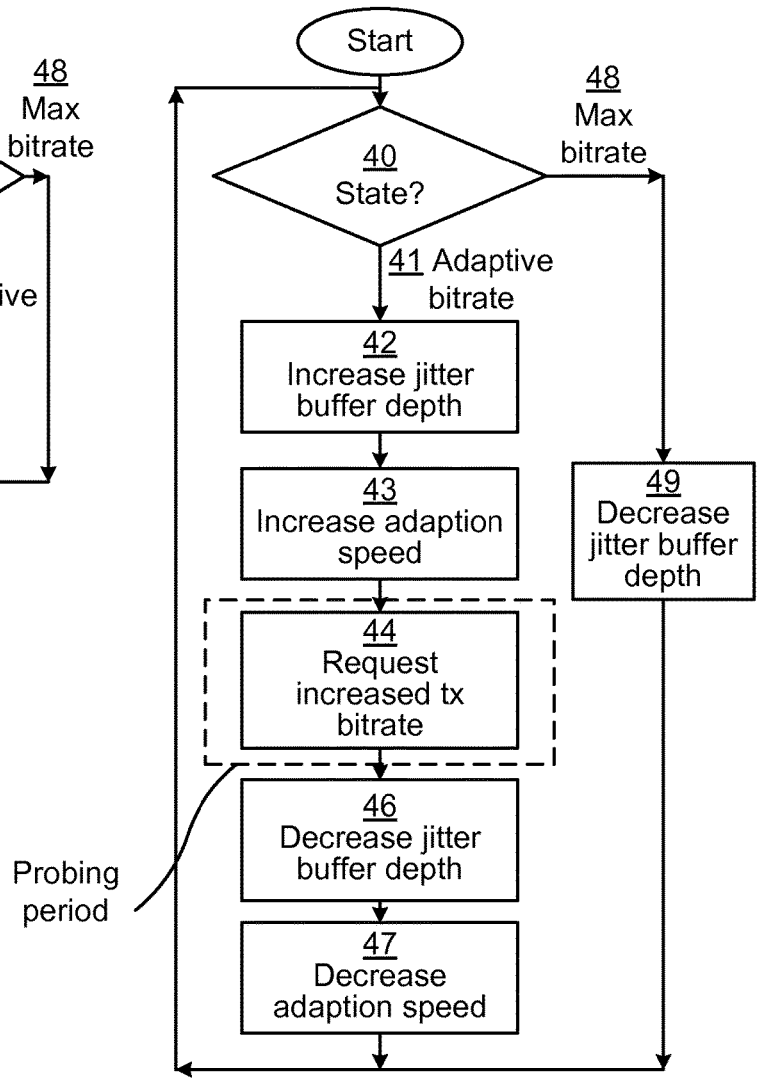

FIGS. 13A-B are flow charts illustrating embodiments of methods for managing a jitter buffer depth performed in a receiver, such as the receiver 1 of FIG. 1. The receiver is used for real-time communication, such as video and/or audio communication.

In a conditional state step 40, it is determined whether an adaptive bitrate state of the receiver occurs. Adaptive bitrate is when a current capacity of a communication channel for receiving the real-time communication is below a maximum bitrate for receiving the real-time communication. This can be determined in the receiver or determined by the transmitter and signalled to the receiver. If adaptive bitrate 41 is determined, the method proceeds to an increase jitter buffer depth step 42. Otherwise, typically indicating a maximum bitrate state 48, the method ends.

In the increase jitter buffer depth step 42, a depth of the jitter buffer for receiving the real-time communication is increased. Optionally, the rate of increase of the jitter buffer is limited to a limiting increase rate. Since an increase in the jitter buffer depth delays playout, there is a risk for artefacts (such as time scaling of audio) due to the increase in jitter buffer depth. By limiting the rate of increase of the jitter buffer depth, the effect of such artefacts can be reduced.

Optionally, the increase of the jitter buffer depth is started at a time to allow the jitter buffer to reach a sufficient level to handle attempts of increased bitrate over the communication channel during a probing period, without exceeding the limiting increase rate. In other words, as seen in FIG. 12, the jitter buffer depth increase can start at the advance time 190 to allow the jitter buffer depth to increase such that the end-to-end delay 171 covers the transmission delay 160

Looking now to FIG. 13B, only new or modified steps compared to the method illustrated by the flow chart of FIG. 13A will be described.

Here, if it is determined in the conditional state step 40 that the receiver is in the maximum bitrate state, the method proceeds to a decrease jitter buffer depth step 49. The maximum bitrate can e.g. be determined by determining that a current capacity of the communication channel for receiving the real-time communication is at least the maximum bitrate for receiving the real-time communication. This can be determined in the receiver or determined by the transmitter and signalled to the receiver.

In the decrease jitter buffer depth step 49, the depth of the jitter buffer is decreased. This only needs to be performed until a base depth of the jitter buffer is reached, after which further decreases do not need to occur, even if the receiver is still in the max bitrate state. After this step, the method returns to the conditional state step 40.

Optionally, the increase jitter buffer depth step 42 comprises increasing the depth in conjunction when a probing period is about to start. In such a case, the receiver knows that probing is about to start and thus increased the jitter buffer depth to be able to handle the potentially increased delay during the probing.

In an increase adaptation speed step 43, an adaptation speed of the jitter buffer is increased. The adaptation of the jitter buffer can e.g. be based on loss. The adaptation speed is increased in conjunction when a probing period is about to start. This makes the jitter buffer more adaptive when probing occurs, since there is an increased risk of delay when probing occurs.

In a request increased tx bitrate step 44, an increased transmission bitrate is requested from the transmitter during the probing period.

In a decrease jitter buffer depth step 46, the depth of the jitter buffer is decreased in conjunction when the probing period ends, e.g. as shown in FIG. 12. Optionally, the rate of decrease of the jitter buffer is limited to a limiting decrease rate. Since a decrease in the jitter buffer changes playout times, there is a risk for artefacts (such as time scaling of audio) also in decreasing the jitter buffer. By limiting the rate of decrease of the jitter buffer, the effect of such artefacts can be reduced.

In a decrease adaptation speed step 47, the adaptation speed of the jitter buffer decreased when the probing period ends. This returns the adaptation speed to a state prior to performing the increase adaptation speed step 43. In other words, the adaptation speed is returned to a normal level after the increased adaptation speed during the probing period.

Figure 14:
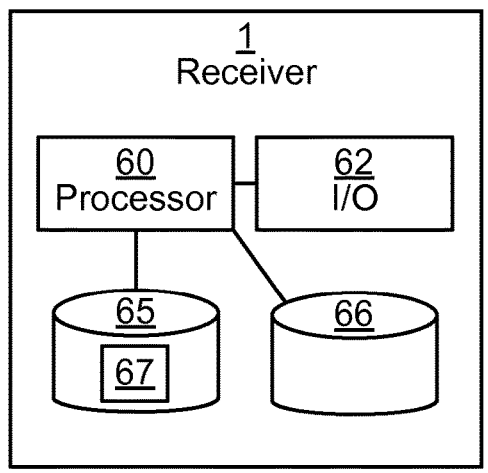
FIG. 14 is a schematic diagram illustrating components of a receiver according to one embodiment.

FIG. 14 is a schematic diagram illustrating components of a receiver according to one embodiment. A processor 60 is provided using any combination of one or more of a suitable central processing unit (CPU), multiprocessor, graphics processing unit (GPU), microcontroller, digital signal processor (DSP), application specific integrated circuit etc., capable of executing software instructions 67 stored in a memory 65, which can thus be a computer program product. The processor 60 can be configured to execute the method of FIGS. 13A-B.

The memory 65 can be any combination of read and write memory (RAM) and read only memory (ROM). The memory 65 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The receiver further comprises an I/O interface 62 for communicating with other external entities, e.g. for real time communication. The real-time communication can comprise video data and/or audio data. The I/O interface 62 also includes a user interface.

Other components of the receiver are omitted in order not to obscure the concepts presented herein.

The receiver can be implemented in a host device, such as a mobile phone, tablet computer, laptop computer or desktop computer, in which case one or more or even all of the components of FIG. 14 are shared with the host device.

Figure 15:
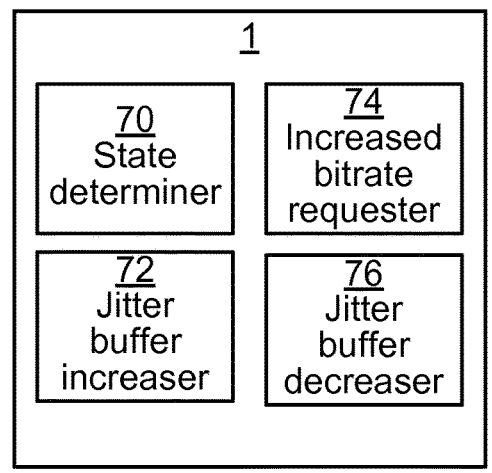
FIG. 15 is a schematic diagram illustrating modules of the receiver of FIG. 14 according to one embodiment.

FIG. 15 is a schematic diagram showing functional modules in the receiver of FIG. 14 according to one embodiment. The modules can be implemented using software instructions such as a computer program executing in the receiver 1 and/or using hardware, such as application specific integrated circuits, field programmable gate arrays, discrete logical components, etc. The modules correspond to the steps in the methods illustrated in FIGS. 13A-B.

Figure 16:
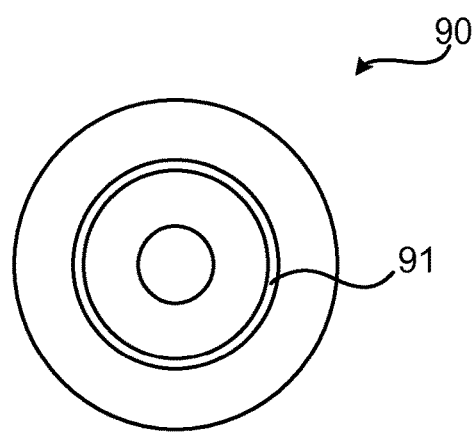
FIG. 16 shows one example of a computer program product comprising computer readable means according to one embodiment.

FIG. 16 shows one example of a computer program product 90 comprising computer readable means according to one embodiment. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program products 65 of FIG. 14. While the computer program 91 is here schematically shown as a track on the depicted optical disk, the computer program can be stored in any way which is suitable for the computer program product, such as a removable solid state memory (e.g. a universal serial bus memory).

Embodiments presented herein improve network efficiency for real-time communication services. This reduces costs but likely also increases the number of satisfied users, which keeps the churn rate low and operator revenues steady.

Here now follows a list of enumerated embodiments from a slightly different perspective.

i. A method for managing a jitter buffer size for receiving real-time communication, the method being performed in a receiver and comprising the steps of:

determining (40) an adaptive bitrate state of the receiver by determining that a current capacity of a communication channel for receiving the real-time communication is below a maximum bitrate for receiving the real-time communication; and increasing (42) a depth of a jitter buffer for receiving the real-time communication when the adaptive bitrate state is determined.

ii. The method according to embodiment i, wherein the step of increasing (42) the depth of the jitter buffer comprises limiting the rate of increase of the jitter buffer to a limiting increase rate.

iii. The method according to embodiment ii, wherein the step of increasing (42) the depth of the jitter buffer is started at a time to allow the jitter buffer to reach a sufficient level by the time the probing period ends, without exceeding the limiting increase rate.

iv. The method according to any one of the preceding embodiments, wherein the step of increasing (42) a depth comprises increasing the depth when a probing period is about to start; and wherein the method further comprises the steps of:

requesting (44) an increased transmission bitrate from the transmitter during the probing period; and decreasing (46) the depth of the jitter buffer when the probing period has ended.

v. The method according to embodiment iv, wherein the step of decreasing (46) the depth of the jitter buffer comprises limiting the rate of decrease of the jitter buffer.

vi. The method according to any of the preceding embodiments, further comprising the steps of:
  determining (47) a maximum bitrate state by determining that a current capacity of the communication channel for receiving the real-time communication is at least the maximum bitrate for receiving the real-time communication; and
  decreasing (48) the depth of the jitter buffer when the maximum bitrate state is determined.

vii. The method according to embodiment vi, wherein the step of increasing (42) the depth of a jitter buffer comprises increasing the depth of the jitter buffer with a predetermined fixed amount for the duration of the adaptive bitrate state.

viii. The method according to any one of the preceding embodiments, wherein the real-time communication comprises video data.

ix. The method according to any one of the preceding embodiments, wherein the real-time communication comprises audio data.

x. A receiver arranged to manage a jitter buffer size for receiving real-time communication, the receiver comprising:
  a processor (60); and
  a memory (64) storing instructions (66) that, when executed by the processor, causes the receiver to:
  determine an adaptive bitrate state of the receiver by determining that a current capacity of a communication channel for receiving the real-time communication is below a maximum bitrate for receiving the real-time communication; and
  increase a depth of a jitter buffer for receiving the real-time communication when the adaptive bitrate state is determined.

xi. The receiver according to embodiment x, wherein the instructions to increase the depth of the jitter buffer comprise instructions that, when executed by the processor, causes the receiver to limit the rate of increase of the jitter buffer to a limiting increase rate.

xii. The receiver according to embodiment xi, wherein the instructions to increase the depth of the jitter buffer comprise instructions that, when executed by the processor, causes the receiver to start the increase at a time to allow the jitter buffer to reach a sufficient level by the time the probing period ends, without exceeding the limiting increase rate.

xiii. The receiver according to any one of embodiments x to xii, wherein the instructions to increase a depth comprise instructions that, when executed by the processor, causes the receiver to increase the depth when a probing period is about to start; and wherein the instructions further comprise instructions that, when executed by the processor, causes the receiver to:
  request an increased transmission bitrate from the transmitter during the probing period; and
  decrease the depth of the jitter buffer when the probing period has ended.

xiv. The receiver according to embodiment xiii, wherein the instructions to decrease the depth of the jitter buffer comprise instructions that, when executed by the processor, causes the receiver to limit the rate of decrease of the jitter buffer.

xv. The receiver according to any of embodiments x to xiv, wherein the instructions further comprise instructions that, when executed by the processor, causes the receiver to:
  determine a maximum bitrate state by determining that a current capacity of the communication channel for receiving the real-time communication is at least the maximum bitrate for receiving the real-time communication; and
  decrease the depth of the jitter buffer when the maximum bitrate state is determined.

xvi. The receiver according to embodiment xv, wherein the instructions to increase the depth of a jitter buffer comprise instructions that, when executed by the processor, causes the receiver to increase the depth of the jitter buffer with a predetermined fixed amount for the duration of the adaptive bitrate state.

xvii. The receiver according to any one of embodiments x to xvi, wherein the real-time communication comprises video data.

xviii. The receiver according to any one of embodiments x to xviii, wherein the real-time communication comprises audio data.

xix. A computer program (90) for managing a jitter buffer size for receiving real-time communication, the computer program comprising computer program code which, when run on a receiver causes the receiver to:
  determine an adaptive bitrate state of the receiver by determining that a current capacity of a communication channel for receiving the real-time communication is below a maximum bitrate for receiving the real-time communication; and
  increase a depth of a jitter buffer for receiving the real-time communication when the adaptive bitrate state is determined.

xx. A computer program product (91) comprising a computer program according to embodiment xix and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for managing a depth of a jitter buffer for receiving a real-time media transmission from a transmitter, the method being performed in a receiver and comprising:
  determining that a current bitrate capacity of a communication channel used for receiving the real-time media transmission is below a current transmission bitrate of the real-time media transmission;
  as a result of determining that the current bitrate capacity of the communication channel is below the current transmission bitrate, increasing the depth of the jitter buffer and requesting a decreased transmission bitrate; and
  after increasing the depth of the jitter buffer, requesting an increased transmission bitrate for the real-time media transmission from the transmitter.

2. The method of claim 1, wherein the rate of increase of the jitter buffer depth is limited to a limiting increase rate.

3. The method of claim 2, wherein the increasing the depth of the jitter buffer is started at a time to allow the jitter buffer depth to reach a sufficient level to handle attempts of one or more increased transmission bitrates for the real-time media transmission, without exceeding the limiting increase rate.

4. The method of claim 1, further comprising:
  requesting a decreased transmission bitrate for the real-time media transmission from the transmitter; and decreasing the depth of the jitter buffer in conjunction with the requesting a decreased transmission bitrate.

5. The method of claim 4, wherein the rate of decrease of the jitter buffer depth is limited to a limiting decrease rate.

6. A receiver arranged to manage a depth of a jitter buffer for receiving a real-time media transmission from a transmitter, the receiver comprising:
 a processor; and
 a memory storing instructions that, when executed by the processor, cause the receiver to:
  determine that a current bitrate capacity of a communication channel used for receiving the real-time media transmission is below a current transmission bitrate of the real-time media transmission;
  as a result of a determination that the current bitrate capacity of the communication channel is below the current transmission bitrate, increase the depth of the jitter buffer and request a decreased transmission bitrate; and
  after increasing the depth of the jitter buffer, request an increased transmission bitrate for the real-time media transmission from the transmitter.

7. The receiver of claim 6, wherein the instructions to increase the depth of the jitter buffer comprise instructions that, when executed by the processor, cause the receiver to limit the rate of increase of the jitter buffer depth to a limiting increase rate.

8. The receiver of claim 7, wherein the instructions to increase the depth of the jitter buffer comprise instructions that, when executed by the processor, cause the receiver to start the increase at a time to allow the jitter buffer depth to reach a sufficient level to handle attempts of one or more increased transmission bitrates for the real-time media transmission, without exceeding the limiting increase rate.

9. The receiver of claim 6, wherein the instructions further comprise instructions that, when executed by the processor, cause the receiver to:
 request a decreased transmission bitrate for the real-time media transmission from the transmitter; and
 decrease the depth of the jitter buffer in conjunction with the requesting of a decreased transmission bitrate.

10. The receiver of claim 9, wherein the instructions to decrease the depth of the jitter buffer comprise instructions that, when executed by the processor, cause the receiver to limit the rate of decrease of the jitter buffer depth to a limiting decrease rate.

11. The receiver of claim 6, wherein the real-time media transmission comprises video data.

12. The receiver of claim 6, wherein the real-time media transmission comprises audio data.

13. The receiver of claim 6, being comprised in any one of: a mobile phone, a tablet computer, a laptop computer, and a desktop computer.

14. A computer program product comprising a non-transitory computer readable medium storing a computer program for managing a depth of a jitter buffer for receiving a real-time media transmission, the computer program comprising computer program code which, when executed on a receiver, causes the receiver to perform the method of claim 1.

* * * * *